US010511890B1

(12) United States Patent
Ramesh

(10) Patent No.: US 10,511,890 B1
(45) Date of Patent: Dec. 17, 2019

(54) SYSTEMS AND METHODS FOR INDICATING PROGRESS WITHIN A MEDIA ASSET

(71) Applicant: Rovi Guides, Inc., San Jose, CA (US)

(72) Inventor: Shwetha Ramesh, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/159,159

(22) Filed: Oct. 12, 2018

(51) Int. Cl.
H04N 9/80 (2006.01)
H04N 21/472 (2011.01)
H04N 21/488 (2011.01)
H04N 21/845 (2011.01)

(52) U.S. Cl.
CPC ... H04N 21/47217 (2013.01); H04N 21/4882 (2013.01); H04N 21/8456 (2013.01)

(58) Field of Classification Search
CPC ......... H04N 21/47217; H04N 21/4882; H04N 21/8456
USPC ........................................ 386/262, 230, 248
See application file for complete search history.

(56) References Cited

U.S. PATENT DOCUMENTS

| | | | |
|---|---|---|---|
| 7,761,892 B2 | 7/2010 | Ellis et al. | |
| 9,948,966 B1* | 4/2018 | Panchaksharaiah | ........................ H04N 21/26258 |
| 2013/0163960 A1* | 6/2013 | Abecassis | .............. H04N 5/445 386/244 |
| 2013/0262527 A1* | 10/2013 | Hunter | .................. G06F 3/0484 707/805 |
| 2015/0326688 A1* | 11/2015 | Aarnio | ..................... H04L 67/30 707/748 |
| 2016/0373817 A1* | 12/2016 | Drake | .............. H04N 21/44029 |
| 2017/0013289 A1* | 1/2017 | Nightingale | ..... H04N 21/23113 |
| 2017/0242571 A1* | 8/2017 | Lei | ....................... G06F 3/04847 |
| 2019/0104342 A1* | 4/2019 | Catalano | ............ H04N 21/4662 |

* cited by examiner

*Primary Examiner* — Helen Shibru
(74) *Attorney, Agent, or Firm* — Haley Guiliano LLP

(57) ABSTRACT

Systems and methods are described for indicating progress within a media asset. An illustrative method retrieves a content preference from a database, identifies a plurality of segments of a media asset that match the content preference, each segment of the plurality of segments having a respective duration. The method further calculates a first sum of the respective durations of the plurality of segments of the media asset that match the content preference, determines which of the plurality of segments that match the content preference precede an output position of the media asset, calculates a second sum of the respective durations of the segments determined to precede the output position of the media asset, and generates for display a progress indicator of the media asset based on the second sum as a percentage of the first sum.

20 Claims, 7 Drawing Sheets

SYSTEMS AND METHODS FOR INDICATING PROGRESS WITHIN A MEDIA ASSET

BACKGROUND

This disclosure generally relates to media systems configured to output media and determine an output progress of the media. In particular, methods and systems are provided for computing improved output progress tracking in such media systems.

SUMMARY

Conventional media systems track output progress based on an entire duration of a media asset and an output position most recently accessed by the media system. For example, if a user views 30 minutes from a 60-minute recording of a television (TV) show, a conventional system will indicate that the user viewed 30 minutes or 50% of the TV show. However, media assets frequently include segments that are of no interest to the user and/or that the user has no intention of watching, such as commercials, credits, content that is disliked by the user, etc. Following from the prior example, conventional systems will inform the user that consumption of the television show is 50% complete even if the final 30 minutes includes content that the user has no intention of ever watching. As a result, users may be misled by the output progress indicated by conventional media systems and may inadvertently instruct the system to resume output of a media asset even though the remaining content is of little interest to the user, thus wasting the user's time and system resources.

Accordingly, methods and systems described herein solve the aforementioned problems by presenting a progress indicator for a media asset based on an output progress of content that matches a user's content preferences, as opposed to overall output progress of a full duration of the media asset. For example, the systems described herein identify segments in media assets that match a preference of the user. The systems determine a percentage of the matching content that precedes an output position and determines the output progress based on the percentage. For example, assume baseball content is a preference of the user. When an output position in the media asset is after all of the baseball content, (e.g., because a user watched all of the baseball content in the media asset or because the user began viewing the media asset at an output position following all of the baseball content), the system will determine that the output progress of the media asset is complete, regardless of whether the output position is at an end of the media asset. As another example, a documentary may describe baseball in a first half and rugby in a second half. When the output position is halfway through the baseball portion (i.e., through 25% of the total time in the documentary) the systems will determine that the output progress for the documentary is 50%. Advantageously, these techniques provide a more accurate output progress calculation to the user, which prevents the systems from wasting resources outputting content that is of little or no interest to the user.

The methods and systems described herein may be implemented using an application, such as a media application, configured to compute the output progress of content that matches content preferences in a profile of the user. The media application retrieves content preferences of a user from a profile associated with the user. The media application identifies content that is associated with each segment of the media asset and compares the content associated with the segment with the retrieved user content preferences. For example, the user may be watching a sports documentary, that is 80 minutes long, via the media application. The media application may determine that the first 5 minutes of the documentary include commercials and an intro, the next 20 minutes relate to baseball, the next 25 minutes relate to rugby, and the last 30 minute relates to football. The media application identifies segments of the media asset that match the content preferences, such as the segments relating to baseball, because the segments include content that matches the content preferences (e.g., baseball content). By identifying the segments that include content that matches the user's content preferences, the media application is able to compute an output progress based on those segments in the media asset that are preferred by the user.

The media application determines, based on a current output position of the media asset, an output progress in the media asset based on a percentage of segments that match the user's content preferences and precede the output position. For example, the media application may determine that a current output position is at the 20-minute mark in the media asset (e.g., the media application is outputting the content at the 20-minute mark because the user watched 20 minutes of the media asset or the user selected the 20-minute mark in the media asset). In response to determining that the current output position is at the 20-minute mark, the media application identifies segments matching the preferences of the user that precede the output position. For example, the media application determines that the segments corresponding to the first 15 minutes of baseball precede the output position and match the content preferences of the user. In response to identifying the segments, the media application calculates a sum of the durations of the segments preceding the output position (e.g., the 15 minutes of the media asset including baseball content).

The media application determines a total duration of the segments of the media asset that match the content preferences of the user to determine a percentage of those segments that precede the output position. The media application computes a percentage based on the total length of the segments relating to baseball (e.g., 20 minutes) and the length of the segments relating to baseball that precede the output position (e.g., 15 minutes). In the above example, the media application determines that the output progress in the documentary is 75% because 15 minutes (the duration of baseball content preceding the output position) is 75% of 20 minutes (the total duration of baseball content in the media asset). It should be noted that conventional systems would compute the output progress as 25% because 20 minutes (e.g., the output position) is 25% of an overall duration of the media asset (e.g., 80 minutes).

The media application presents an indication of the computed output progress to the user. For example, the media application may generate for display text indicating the output progress (e.g., 75%). In some embodiments, the media application presents a progress bar based on the percentage. For example, the media application may highlight 75% of the progress bar to indicate that the output position of the media asset is 75% of the way through the content that matches the user's preferences. In some embodiments, the media application generates for display a progress bar that visually distinguishes the content that matches the user's preferences from the content that does not match the user's preferences. For example, the media application may generate an 80-minute time bar for the documentary and may highlight the portion of the time bar corresponding to minutes 5-25 because minutes 5-25 relate to baseball content. The time bar may be simultaneously displayed with the progress bar discussed above. In some embodiments, the media application may indicate that output of the media asset is complete when the percentage exceeds a predefined value. For example, the media application may determine that output of the media asset is complete when the output progress is 100%, regardless of whether the output position has reached an end of the media asset and may terminate output of the media asset. By presenting the progress indicator to the user, the user can quickly determine how much content in the media remains that matches the user's preferences.

In some embodiments, the media application monitors the user's consumption progress of the media asset and determines whether the segments that include content that matches the user's preferences have been consumed. For example, the media application may determine whether the user consumed the 15 minutes of the baseball content or whether the user initially selected an output position in the media asset at a point that was 15 minutes into the baseball content. The media application generates a second progress indicator to indicate to the user whether the user consumed the segments having content that matches the user preferences. For example, if the user selected an output position in the documentary beginning at the 20-minute mark (e.g., 15 minutes into the baseball content), but did not consume any of the content preceding the 20-minute mark, the system may present a second progress indicator indicating that 0% of the content has been consumed (e.g., because the user did not actually consume any of the content that matches the user's preferences).

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
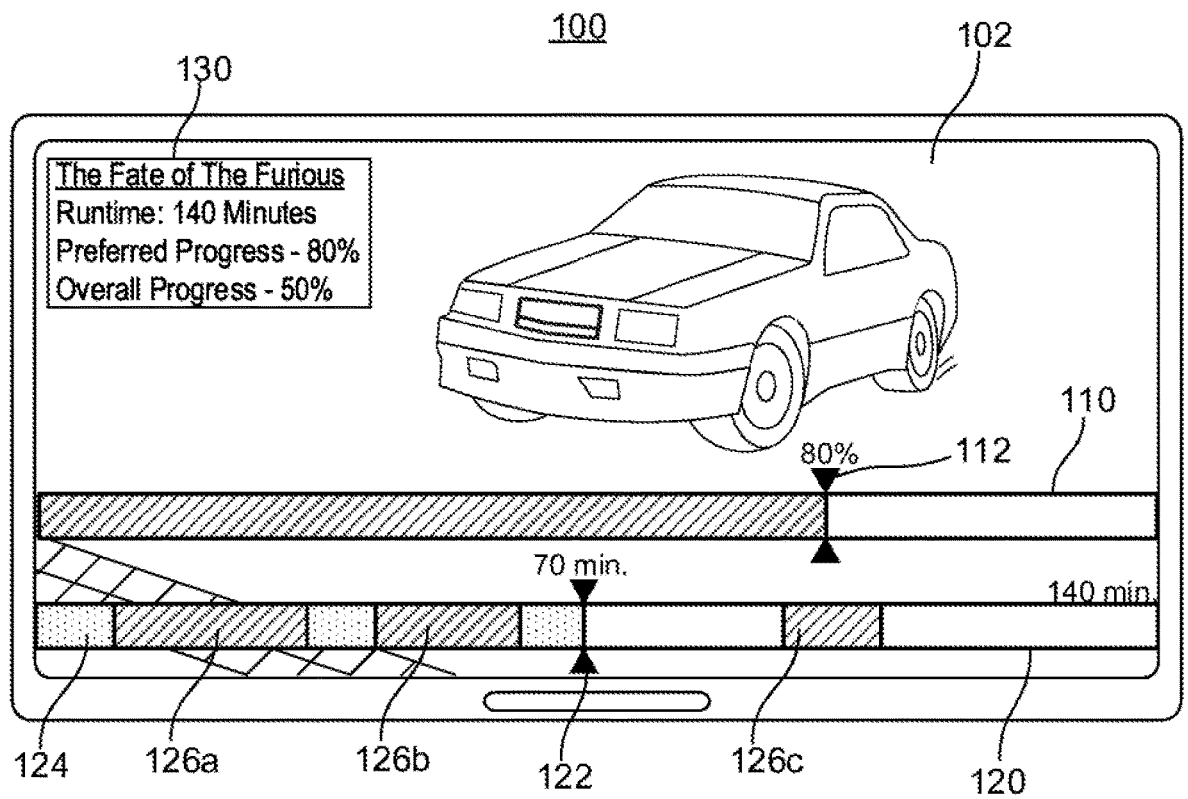
FIG. 1 shows an illustrative interface for indicating an output progress of a media asset, in accordance with some embodiments of the disclosure.

FIG. 1 shows an illustrative user interface that indicates an output progress of a media asset, in accordance with some embodiments of the disclosure. A display 100 is depicted outputting a media asset 102. As referred to herein, the term "media asset" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the same, having an output duration. For example, a media application retrieves a media asset, such as an action movie, from a content source, such as a media content source 402 (discussed below in relation to FIG. 4), and may output the media asset on the display 100. While referred to herein as a "media application," those skilled in the art will appreciate that the user interface may be generated by any application, engine, logic, operating system, middleware, firmware, and/or combination thereof, that may be used to output media content.

In some embodiments, the display 100 is coupled to a media device (e.g., device 300 or 301) comprising control circuitry (e.g., control circuitry 304), discussed further below with respect to FIG. 3. As referred to herein, the phrase "media device" should be understood to mean any device for accessing the media asset described above, such as a television, a Smart TV, a set-top box, an integrated receiver decoder (IRD) for handling satellite television, a digital storage device, a digital media receiver (DMR), a digital media adapter (DMA), a streaming media device, a DVD/BLU-RAY player/recorder, a local media server, a personal computer (PC), a laptop computer, a tablet computer, a WebTV box, a personal computer television (PC/TV), a PC media server, a PC media center, a handheld computer, a stationary telephone, a smartphone, a portable video player, a portable music player, a portable gaming machine, or any other television equipment, computing equipment, or wireless device, and/or combination of the same.

The device 300 determines an output progress of the media asset 102 based on a percentage of content of the media asset that matches one or more preferences of a user of the media application. For example, the media application may retrieve preferences of the user from storage that is accessible to the media application (e.g., a database stored in storage 308 of a device 300, 301 (FIG. 3), or a media content source 402 or a processing server 404 (FIG. 4), described below).

In addition to the media asset 102, the display 100 further includes a progress bar indicating an output progress of portions of the media asset 102 that match content preferences of the user (referred to hereinafter as a preferred progress bar 110). The preferred progress bar 110 includes a preferred progress indicator 112 indicating a position on the preferred progress bar 110 corresponding to a percentage of the portions of the media asset 102 that match the content preferences of the user that has been output. In some embodiments, the preferred progress indicator 112 includes a textual indication of the percentage of the portions of the media asset 102 that match the content preferences of the user that has been output. In the example shown in FIG. 1, the preferred progress indicator 112 indicates an 80% progress. In other embodiments, the textual indication included in preferred progress indicator 112 includes a time corresponding to a sum of the durations of portions of the media asset that match the content preferences of the user that have been output, or a number corresponding to an amount of portions of the media asset that match the content preferences of the user that have been output.

The display 100 further includes another progress bar indicating an overall output progress of the media asset 102 (referred to hereinafter as an overall progress bar 120). The overall progress bar 120 includes an output position indicator 122 indicating a position on the overall progress bar 120 corresponding to a current output position of the media asset 102. In some embodiments, the output position indicator 122 includes a textual indication of a time corresponding to an overall duration of the media asset that has been output and/or that remains to be output. In the example shown in FIG. 1, the output position indicator 122 indicates that 70 minutes of the media asset have been output. The overall progress bar 120 further includes indications of portions of the media asset 102 corresponding to segments that do not match the content preferences of the user (referred to hereinafter as non-preferred segments 124) and indications of portions of the media asset 102 corresponding to segments that match the content preferences of the user (referred to hereinafter as preferred segments 126*a*, 126*b*, and/or 126*c*). Some portions, such as preferred segments 126*a* and 126*b*, may precede the output position indicator 122, thus indicating that the preferred segments 126*a* and 126*b* have already been output. Additionally, some portions, such as preferred segment 126*c*, may be after the position of the output position indicator 122 in the overall progress bar 120, thus indicating that the preferred segment 126*c* has not yet been output. As described further below, the position and/or percentage of the preferred progress indicator 112 may be determined based on the preferred segments 126*a* and 126*b* that precede the output position indicator 122.

The display 100 also includes a progress window 130, which indicates a title of the media asset 102, a total runtime of the media asset 102, the preferred progress (i.e., the amount of content matching the user's content preferences that has been output in the media asset 102), and the overall progress (i.e., the overall amount of content that has been output in the media asset 102). In the example shown in FIG. 1, the progress window indicates that the media asset 102 being output is "THE FAST AND THE FURIOUS," which has a runtime of 140 minutes, and that 80% of the content that matches the user's content preferences (e.g., the content that relates to sports cars) has already been output, and that the overall output progress is 50%.

Figure 2:
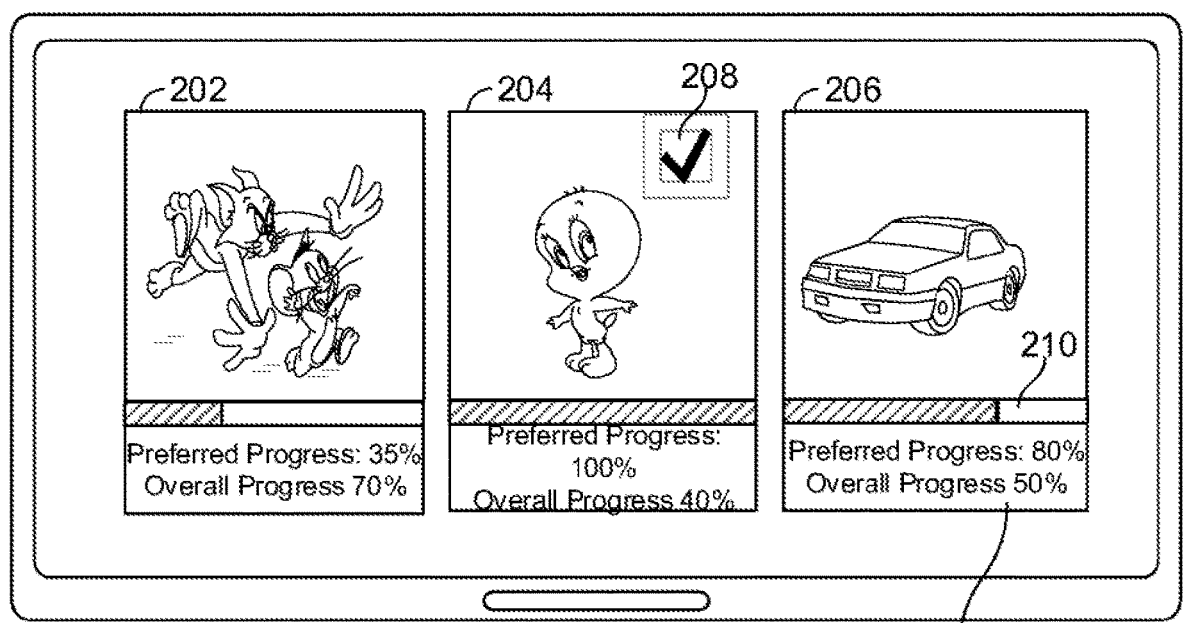
FIG. 2 shows an additional illustrative interface for indicating an output progress of media assets, in accordance with some embodiments of the disclosure.

FIG. 2 shows an additional illustrative interface for indicating an output progress of media assets, in accordance with some embodiments of the disclosure. A display 200 is depicted showing progress indications for a plurality of media assets including a first media asset 202, a second media asset 204, and a third media asset 206. The display 200 shows a preferred progress bar 210 corresponding to media asset indicators for each of the first media asset 202, the second media asset 204, and the third media asset 206, indicating an output progress of portions of the respective media assets 202, 204, and 206, that match content preferences of the user. The display 200 further shows textual indications 230 for each of the first media asset 202, the second media asset, 204, and the third media asset 206, indicating a preferred output progress percentage and an overall output progress percentage for each of the media assets 202, 204, and 206. For example, as shown in FIG. 2, the preferred output progress bar 210 and preferred output progress percentage for the first media asset 202 indicate that 35% of the portions of the first media asset 202 that match content preferences of the user has been output, and that the overall output progress of the first media asset 202 is 70%. Thus, even though the overall output progress is 70%, 65% of the portions of the first media asset 202 that match content preferences of the user has not yet been output, meaning that most of the portions of the first media asset 202 that the user prefers are in the remaining 30% of the first media asset 202.

As another example, the preferred output progress bar 210 and the preferred output progress percentage for the third media asset 206 indicates that 80% of the portions of the third media asset 206 that match content preferences of the user has been output, and that the overall output progress of the third media asset 206 is 50%. Thus, even though the overall output progress is only 50%, 80% of the portions of the third media asset 206 that match content preferences of the user has already been output, meaning that most of the portions of the third media asset that the user prefers have already been output.

In yet another example, the preferred output progress bar 210 and the preferred output progress percentage for the second media asset 204 indicates that 100% of the portions of the second media asset 204 that match content preferences of the user has been output, and that the overall output progress of the second media asset 204 is 40%. Thus, even though a mere 40% of the second media asset 204 has been output, all of the portions of the second media asset 204 that match content preferences of the user have already been output. In this instance, the display 200 shows a completion indication 208 indicating that all of the portions of the second media asset 204 that match the content preferences of the user have already been output. As shown in FIG. 2, the completion indication 208 is a check mark, but those skilled in the art will appreciate that any visual or audio indication or characteristic may be used to indicate completion of the preferred output progress. For example, the media asset indicator for the second media asset 204 may be dimmed, shaded, highlighted, discolored, displaced, resized, outlined, and/or have any other differentiating visual characteristic applied to it so as to indicate that the preferred output progress of the second media asset 204 is complete.

Figure 3:
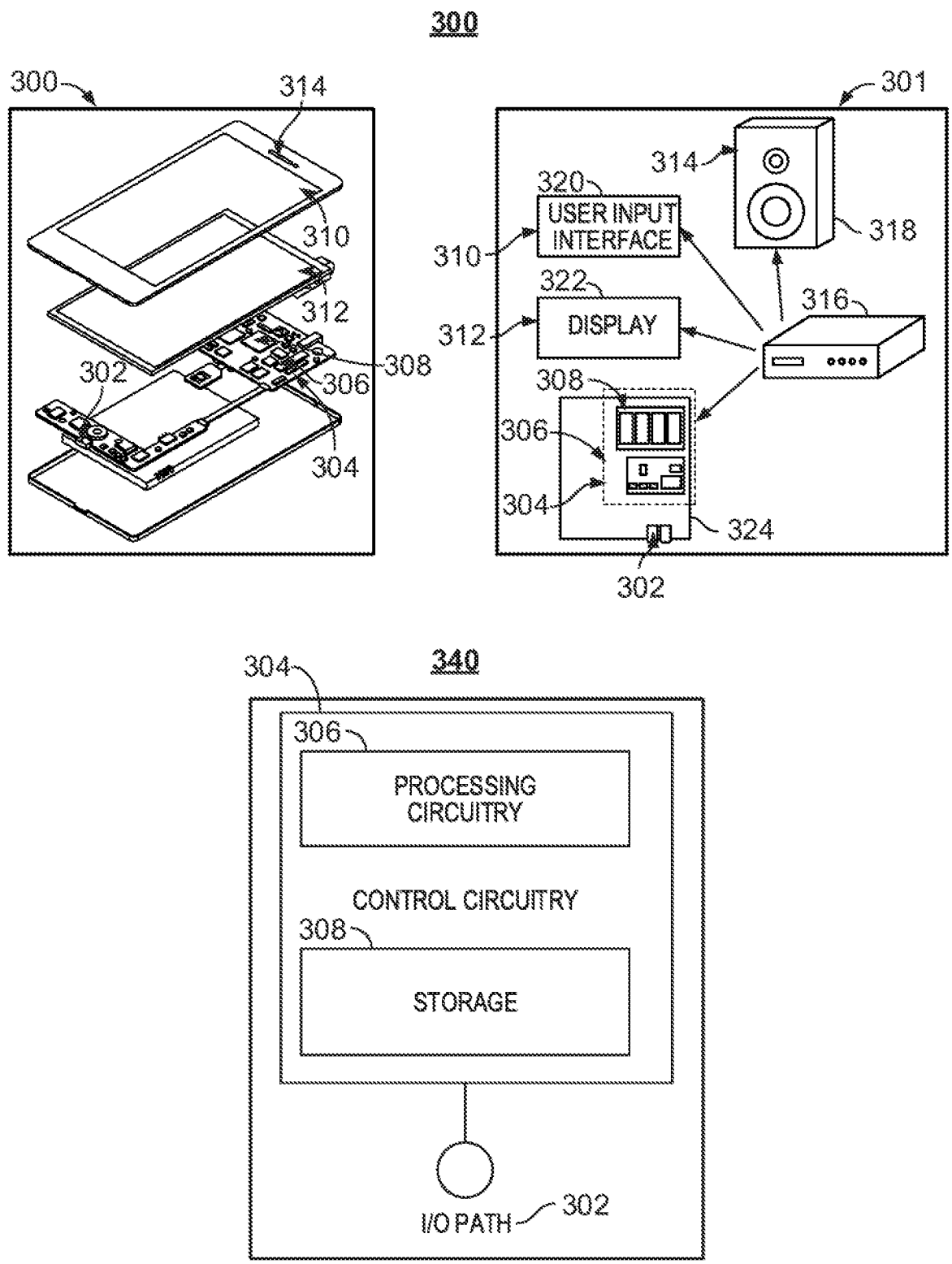
FIG. 3 is a diagram of an illustrative computing device, in accordance with some embodiments of the disclosure.

FIG. 3 shows a generalized embodiment of illustrative media devices 300 and 301, and a server device 340. As depicted, the media device 300 may be a smartphone or tablet, whereas the media device 301 may be a home media system that includes an equipment device 316 (e.g., a set-top box, CPU, videogame console, etc.) powered by a processor 324. The media devices 300 and 301 may receive content and data via an input/output (hereinafter "I/O") path 302. The I/O path 302 may provide media content (e.g., broadcast programming, on-demand programming, Internet content, content available over a local area network (LAN) or wide area network (WAN), and/or other content), supplemental content and data to control circuitry 304, which includes processing circuitry 306 and storage 308. The control circuitry 304 may be used to send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths but are shown as a single path in FIG. 3 to avoid overcomplicating the drawing. In addition to the media devices 300, 301, the server device 340 may also have control circuitry 304 that includes processing circuitry 306, storage 308, and I/O path 302. These components can function in the same manner as described in relation to media devices 300 and 301.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry 306 is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 304 executes instructions for a media application stored in memory (i.e., the storage 308). Specifically, the control circuitry 304 may be instructed by the media application to perform the functions discussed above and below.

In client/server-based embodiments, the control circuitry 304 includes communications circuitry suitable for communicating with a media application server or other networks or servers. The instructions for carrying out the above-mentioned functionality may be stored on a server, such as a media content source or a processing server 404, described below. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage, described in relation to FIG. 4, may be used to supplement the storage 308 or instead of the storage 308.

The control circuitry 304 may include audio-generating and/or video-generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio or video signals for storage) may also be provided. The control circuitry 304 may also include scaler circuitry for upconverting and downconverting content into the preferred output format of the media device 300. The control circuitry 304 may also include digital-to-analog converter circuitry and analog-to-digital converter circuitry for converting between digital and analog signals. The tuning and encoding circuitry may be used by the media device 300 to receive and to display, to play, or to record content. The circuitry described herein, including for example, the tuning, audio-generating, video-generating, encoding, decoding, encrypting, decrypting, scaler, and analog/digital circuitry, may be implemented using software running on one or more general purpose or specialized processors. Multiple tuners may be provided to handle simultaneous tuning functions. If the storage 308 is provided as a separate device from the media device 300, the tuning and encoding circuitry (including multiple tuners) may be associated with the storage 308.

A user may send instructions to the control circuitry 304 using a user input interface 310 of the media device 300 or a user input interface 320 of the media device 301. The user input interface 310 and the user input interface 320 may be any suitable user interface, such as a remote control, mouse, trackball, keypad, keyboard, touchscreen, touchpad, stylus input, joystick, voice recognition interface, or other user input interfaces. Display 312 may be a touchscreen or touch-sensitive display. In such circumstances, user input interface 310 may be integrated with or combined with the display 312. Display 322 may be provided as a stand-alone device or integrated with other elements of the media device 301. Speakers 314 may be provided as integrated with other elements of the media device 300. In the case of the media device 301, speakers 318 may be stand-alone units (e.g., smart speakers). The audio component of videos and other content displayed on the display 322 may be played through the speakers 318. In some embodiments, the audio is distributed to a receiver (not shown), which processes and outputs the audio via the speakers 318.

The media application may be implemented using any suitable architecture. For example, it may be a stand-alone application wholly implemented on the media device 300. The media application and/or any instructions for performing any of the embodiments discussed herein may be encoded on computer-readable media. Computer-readable media includes any media capable of storing data. In some embodiments, the media application is a client/server-based application. Data for use by a thick or thin client implemented on the media device 300 or the media device 301 are retrieved on demand by issuing requests to a server remote to the media device 300 or the media device 301, respectively. For example, the media device 300 may receive inputs from the user via the input interface 310 and transmit those inputs to the remote server for processing and generating the corresponding outputs. The generated output is then transmitted to the media device 300 for presentation to the user. Those skilled in the art will appreciate that the display 100 of FIG. 1 and display 200 of FIG. 2 may be implemented on or displayed by the media device 300 and/or the media device 301 of FIG. 3.

Figure 4:
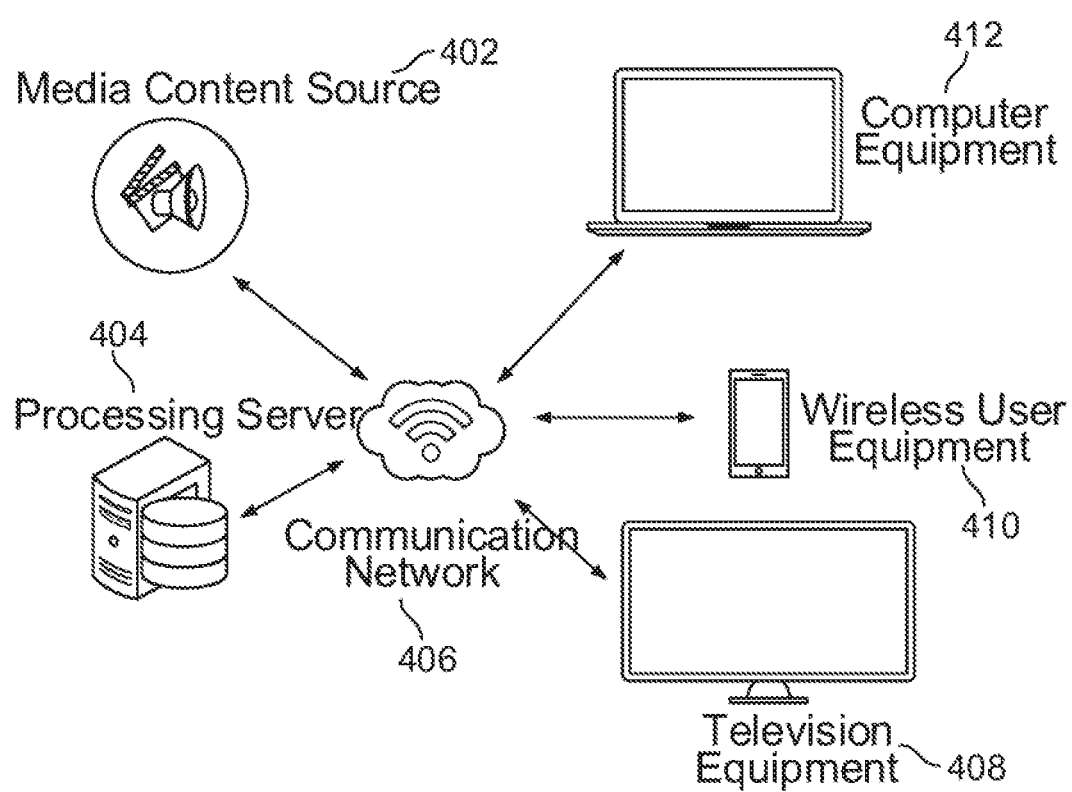
FIG. 4 is a diagram of an illustrative media system, in accordance with some embodiments of the disclosure.

Devices 300, 301 and 340 can be part of system 400 of FIG. 4 as television equipment 408, computer equipment 412, wireless user equipment 410, or any other type of user equipment suitable for accessing content, such as a non-portable gaming machine. For simplicity, these devices may be referred to herein collectively as media devices and may be substantially similar to media devices described above.

In system 400, there is typically more than one of each type of media device but only one of each is shown in FIG. 4 to avoid overcomplicating the drawing. In addition, each user may utilize more than one type of media device and also more than one of each type of user equipment device.

The user equipment devices may be coupled to communication network 406. Communication network 406 may be one or more networks including the Internet, a mobile phone network, a mobile voice or data network (e.g., a 4G or LTE network), a cable network, public switched telephone network, or other types of communications network or combinations of communications networks. Paths (e.g., depicted as arrows connecting the respective devices to communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the media devices may be provided by one or more of these communications paths but are shown as a single path in FIG. 4 to avoid overcomplicating the drawing.

Although communications paths are not drawn between user equipment devices, these devices may communicate directly with each other via communications paths as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communication network 406.

System 400 further includes a media content source 402 and a processing server 404. Communications with the media content source 402 and the processing server 404 may be exchanged over one or more communications paths but are shown as a single path in FIG. 4 to avoid overcomplicating the drawing. In addition, there may be more than one of each of the media content source 402 and the processing server 404, but only one of each is shown in FIG. 4 to avoid overcomplicating the drawing. If desired, the media content source 402 and the processing server 404 may be integrated as one source device.

The processing server 404 may retrieve guidance data from the media content source 402, process the data (as will be described in detail below), and forward the data to the media devices 408, 410, 412. The media content source 402 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. The media content source 402 may be the originator of content (e.g., a television broadcaster, a webcast provider, etc.) or may not be the originator of content (e.g., an on-demand content provider, an Internet provider of content of broadcast programs for downloading, etc.). The media content source 402 may include cable sources, satellite providers, on-demand providers, Internet providers, over-the-top content providers, or other providers of content. The media content source 402 may also include a remote media server used to store different types of content (including video content selected by a user), in a location remote from any of the media devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

The media content source 402 may also provide media guidance data that can be used to generate carousels and queries, and output progress data that can be used to generate output progress indicators, as described herein. Media guidance data may be provided to the media devices using any suitable approach. Program schedule data and other guidance data may be provided to the media devices on a television channel sideband, using an in-band digital signal, using an out-of-band digital signal, or by any other suitable data transmission technique. Likewise, output progress data may be provided to the media devices via any of the above-described data transfer paths and/or devices.

The media devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communication network 406. In such embodiments, user equipment devices may operate in a peer-to-peer manner without communicating with a central server.

The systems and devices described in FIGS. 3 and 4 enable not only display of the screens of FIGS. 1 and 2, but also the execution of processes described in FIGS. 5-8.

Figure 5:
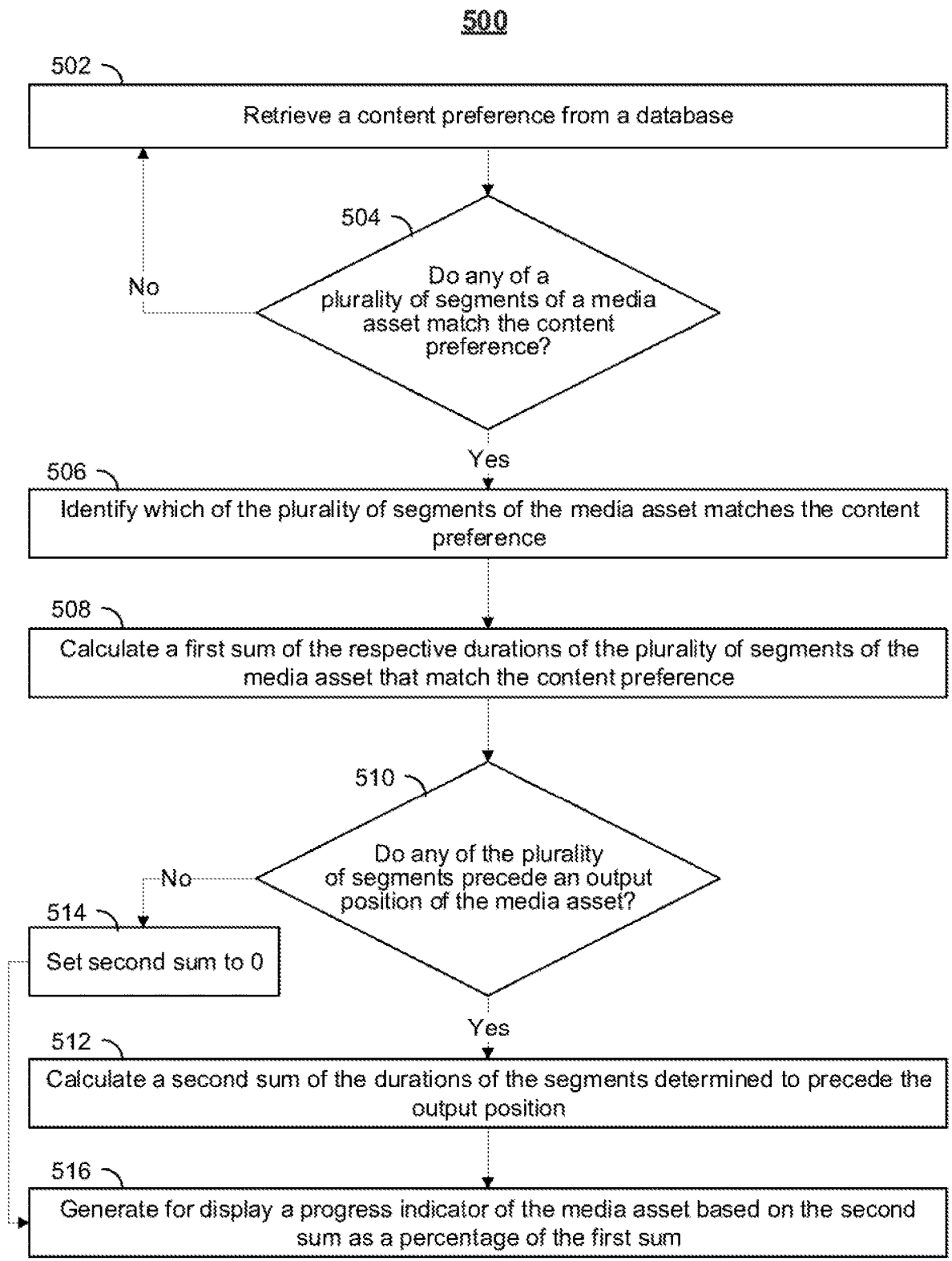
FIG. 5 is a flowchart of an illustrative process for determining an output progress of a media asset, in accordance with some embodiments of the disclosure.

FIG. 5 is an illustrative process for determining an output progress of a media asset, in accordance with some embodiments of the present disclosure. A process 500 for determining an output progress of a media asset may begin at block 502, where control circuitry, such as the control circuitry 304 described above, retrieves one or more content preferences from a database. For example, the control circuitry 304 queries a database included in at least one of the media devices 300, 301, the media content source 402, and/or the processing server 404, for media content preferences included in a user profile associated with the user, and the database responds to the query by sending the content preferences to the control circuitry 304. In some embodiments, the content preference is a preference for a particular genre of media content (e.g., drama, comedy, sports, etc.), a sub-genre (e.g., reality television, stand-up comedy, baseball, etc.), a particular type of media, and/or a particular personality associated with media content (e.g., Meryl Streep, Ben Stiller, Serena Williams). Those skilled in the art will appreciate that this list of content preferences is merely illustrative, and that any other content preferences may be used in addition to or instead of the listed content preferences without departing from the scope of the present disclosure.

At block 504, the control circuitry 304 determines whether any of a plurality of segments of a media asset matches the content preferences retrieved at block 502. For example, as described further below with reference to FIG. 6, the control circuitry 304 compares a content preference retrieved at block 502 with characteristics of various segments of the media asset 102 (e.g., as described in metadata associated with the media asset 102) to determine whether any of the segments of the media asset 102 has a characteristic matching the content preference retrieved at block 502. In response to determining that the metadata indicate that none of the segments of the media asset 102 matches the content preference retrieved at block 502, the process 500 returns to block 502 where another content preference is retrieved. In response to determining that the metadata indicate that a segment of the media asset 102 has a characteristic matching the content preference retrieved at block 502, the process 500 proceeds to block 506.

At block 506, the control circuitry 304 identifies which of the plurality of segments of the media asset 102 match the content preference. For example, as described further below with reference to FIG. 6, the control circuitry 304 analyzes the metadata associated with the media asset 102 to determine which segments of the media asset 102 have characteristics matching the content preference retrieved at block 502. The metadata may indicate characteristics associated with the media asset 102 as a whole and/or characteristics associated with the various segments of the media asset 102 individually. In some embodiments, the metadata includes timecodes, tables, or other markers indicating the different segments of the media asset 102 and/or the characteristics associated with those segments. The control circuitry 304 may determine, based on the timecodes, tables, or other markers included in the metadata, which segments are associated with which characteristics, and thus which segments have characteristics matching the content preference retrieved at block 502.

At block 508, the control circuitry 304 calculates a first sum of the durations of the segments of the media asset 102 that were identified, at block 506, as having characteristics matching the content preference retrieved at block 502. For example, the control circuitry 304 analyzes metadata associated with the media asset 102 to determine a duration of some or all of the segments of the media asset 102, and calculates a sum of the durations of the segments of the media asset 102 that were identified, at block 506, as having characteristics matching the content preference retrieved at block 502.

At block 510, the control circuitry 304 determines whether any of the plurality of segments of the media asset 102, which were identified at block 506 as having characteristics matching the content preference retrieved at block 502, precede an output position of the media asset 102. For example, as described further below with reference to FIG. 6, the control circuitry 304 compares a position of the plurality of segments identified at block 506 to an output position of the media asset 102 and determines which (if any) of the segments identified at block 506 precede the output position. In some embodiments, the control circuitry 304 compares timecodes, tables, or other markers included in metadata indicating the positions of the plurality of segments identified at block 506 (e.g., segment A starts at 00:00:00; segment B starts at 00:04:57; segment C starts at 00:17:22; etc.) with a timecode corresponding to the output position of the media asset 102 to determine which of the segments precede the output position. In some embodiments, the control circuitry 304 compares the positions of all of the segments of the media asset 102 with the output position of the media asset 102. In response to determining that a segment identified at block 506 precedes the output position of the media asset 102, process 500 proceeds to block 512. In response to determining that none of the segments identified at block 506 precedes the output position of the media asset 102, process 500 proceeds to block 514.

At block 512, the control circuitry 304 calculates a second sum of the durations of the plurality of segments determined, at block 510, to precede the output position of the media asset 102. For example, the control circuitry 304 analyzes metadata associated with the media asset 102 to determine a duration of each of the segments determined, at block 510, to precede the output position of the media asset 102 and calculates a sum of those durations.

At block 514, the control circuitry 304 sets the value of the second sum to 0. For example, when it is determined at block 510 that none of the segments identified at block 506 precedes the output position of the media asset 102, the value of the sum of the durations of such segments is 0.

At block 516, the control circuitry 304 generates for display a preferred progress indicator of the media asset 102. The control circuitry 304 generates the preferred progress indicator based on the second sum calculated at block 512 (i.e., the sum of the durations of the segments of the media asset 102 that were identified, at block 506, as having characteristics matching the content preference retrieved at block 502, and determined, at block 510, to precede the output position of the media asset 102), as a percentage of the first sum calculated at block 508 (i.e., the sum of the durations of the plurality of segments of the media asset 102 that were identified, at block 506, as having characteristics matching the content preference retrieved at block 502). For example, the control circuitry 304 calculates a value of the second sum as a percentage of the first sum (such as 15 of 50 is 30%), and generates for display a preferred progress indicator, such as preferred progress indicator 112 (FIG. 1), to be shown on display 100 and/or display 200, as described above.

Figure 6:
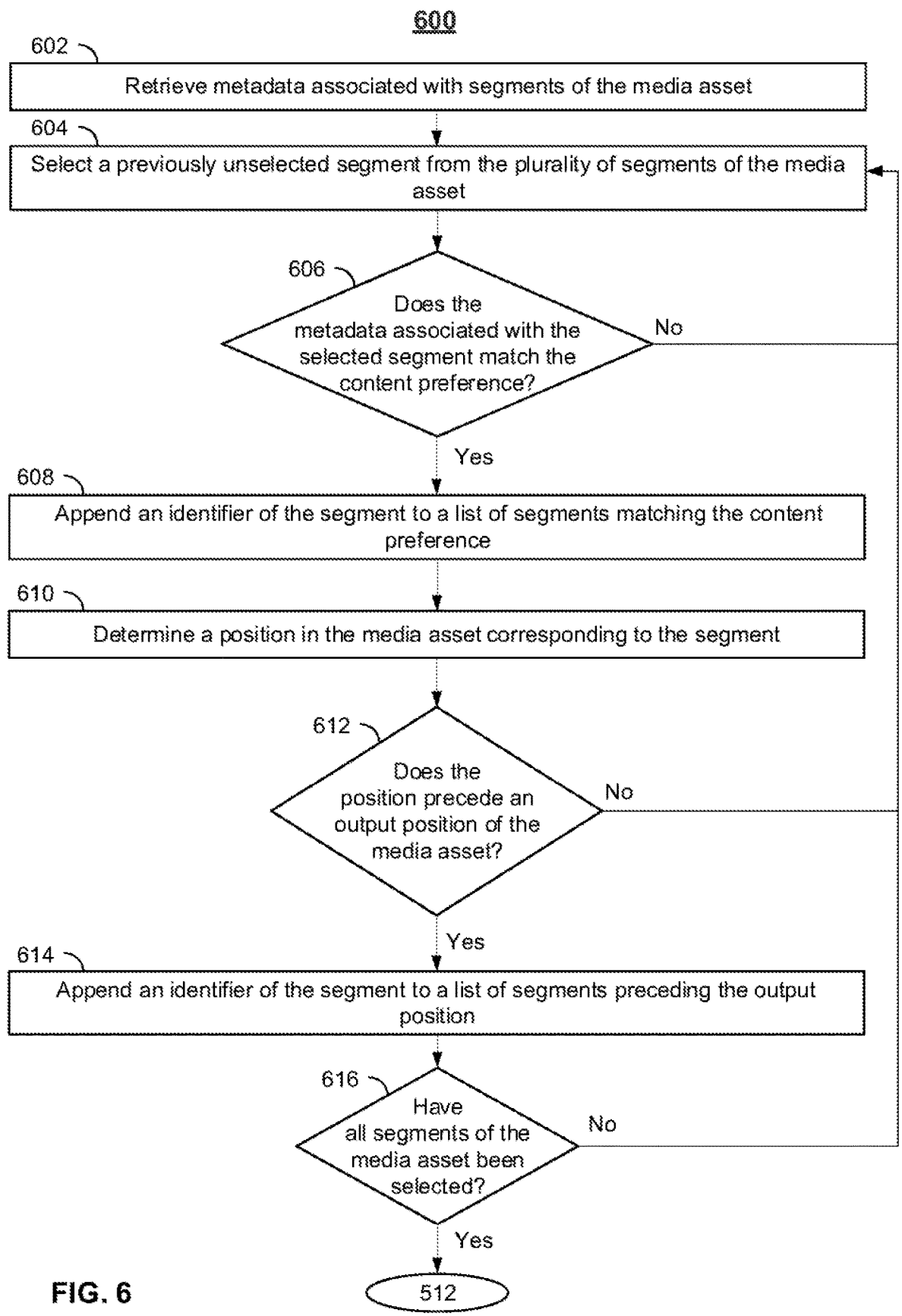
FIG. 6 is a flowchart of an illustrative process for identifying segments of a media asset matching content preferences, in accordance with some embodiments of the disclosure.

Turning now to FIG. 6, there is shown an illustrative process for identifying segments of a media asset matching content preferences, in accordance with some embodiments of the disclosure. A process 600 for identifying segments of a media asset matching content preferences may begin at block 602, where the control circuitry 304 retrieves metadata associated with the media asset 102, and/or with one or more segments of the media asset 102. For example, the metadata may be received with (e.g., be embedded within) the media asset 102, and/or may be retrieved from the same or a different source (e.g., the media content source 402) as the media asset 102.

At block 604, the control circuitry 304 selects a previously unselected segment from the plurality of segments of the media asset 102. For example, the control circuitry 304 determines whether a given segment has been previously selected, such as by querying a database or table, or by checking a flag included in metadata associated with the segment. If the control circuitry 304 determines that the given segment has not previously been selected, the control circuitry 304 may select the given segment.

At block 606, the control circuitry 304 determines whether the metadata associated with the selected segment match a content preference, such as the content preference retrieved at block 502 (FIG. 5). For example, the control circuitry 304 may determine whether a characteristic of the segment is included in the metadata, and if so, whether the characteristic matches the content preference retrieved at block 502. The characteristic of the segment may be a genre, sub-genre, type of media, or personality associated with or shown in the segment, as described above with reference to FIG. 5, and/or may be any other characteristic of media assets or segments thereof known to those skilled in the art that may be used to describe the segment and compared with a content preference. In response to determining that the metadata associated with the selected segment do not match the content preference retrieved at block 502, the process 600 returns to block 604. In response to determining that the metadata associated with the selected segment match the content preference retrieved at block 502, the process 600 proceeds to block 608.

At block 608, the control circuitry 304 appends an identifier of the segment to a list of segments matching the content preference retrieved at block 502. For example, the control circuitry 304 generates and/or updates a list of segments of the media asset 102 that have been determined to have characteristics matching the content preference retrieved at block 502 and adds an identifier of the selected segment to that list.

At block 610, the control circuitry 304 determines a position in the media asset 102 corresponding to the selected segment. For example, the control circuitry 304 analyzes the metadata retrieved at block 602 to identify an indication, such as a timecode or other marker, indicating the position (e.g., a start time and/or an end time) of the segment within the media asset 102.

At block 612, the control circuitry 304 determines whether the position of the selected segment within the media asset 102 precedes an output position of the media asset 102. For example, the control circuitry 304 compares a timecode or other marker corresponding to the position of the segment determined at block 610 to a timecode or other marker corresponding to the output position of the media asset 102, and determines whether the timecode or other marker corresponding to the position of the segment precedes the timecode or other marker corresponding to the output position of the media asset 102. In response to determining that the position of the segment within the media asset 102 does not precede the output position of the media asset 102, the process 600 returns to block 604. In response to determining that the position of the segment within the media asset 102 precedes the output position of the media asset 102, the process 600 proceeds to block 614.

At block 614, the control circuitry 304 appends an identifier of the selected segment to a list of segments preceding the output position of the media asset 102. For example, the control circuitry 304 generates and/or updates a list of segments of the media asset 102 that have been determined to precede the output position of the media asset 102 and adds an identifier of the selected segment to that list.

At block 616, the control circuitry 304 determines whether all segments of the media asset 102 have been selected. For example, the control circuitry 304 queries a database or table, or checks a flag included in metadata associated with the segments of the media asset 102, to determine whether each segment of the media asset 102 has previously been selected. In response to determining that all segments of the media asset 102 have not been selected, the process 600 returns to block 604. In response to determining that all segments of the media asset 102 have been selected, the process 600 rejoins the process 500 at block 512.

Figure 7:
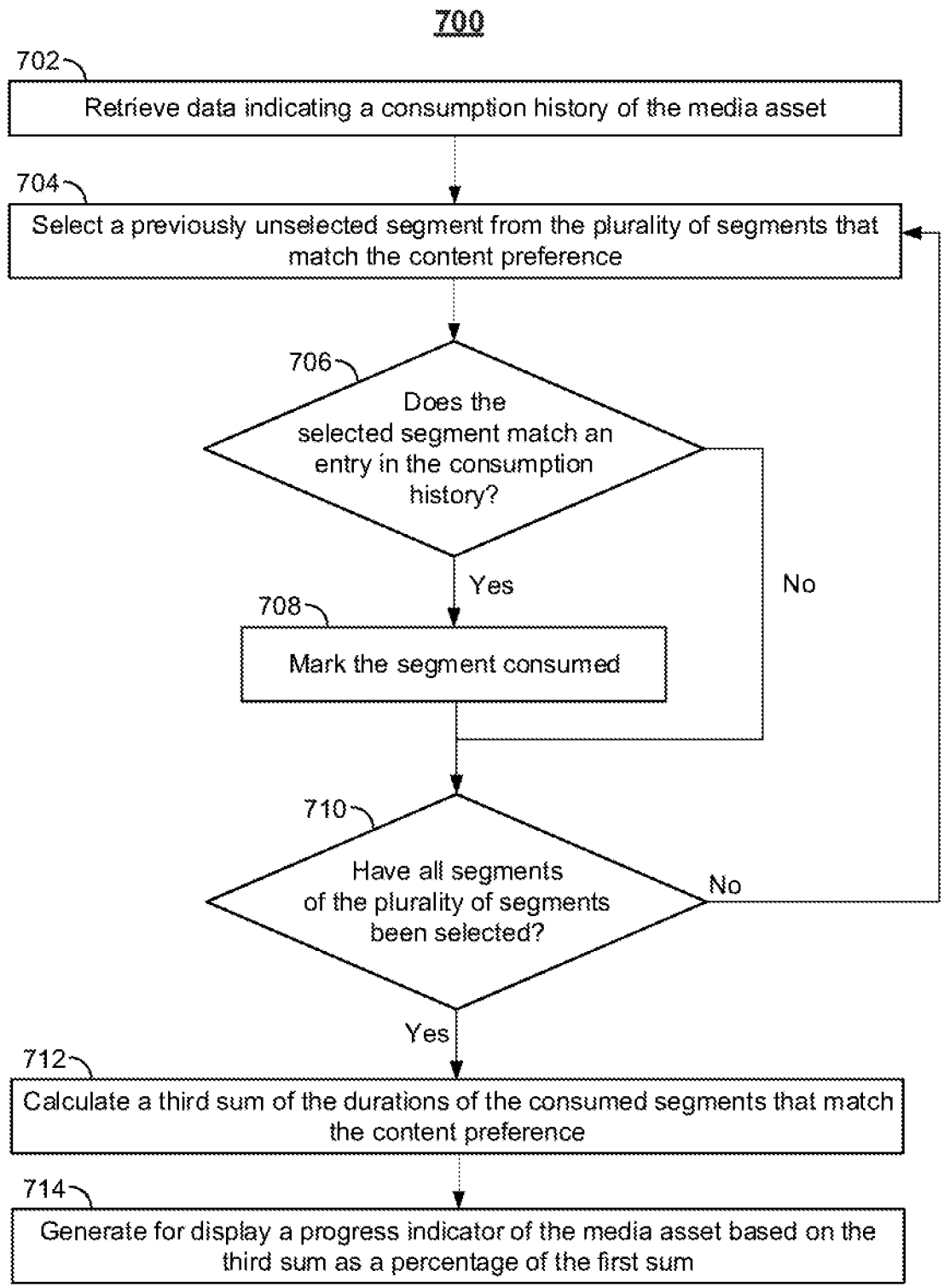
FIG. 7 is a flowchart of an illustrative process for determining whether a user consumed a segment of a media asset, in accordance with some embodiments of the disclosure.

Referring now to FIG. 7, there is shown an illustrative process for determining whether a user consumed a segment of a media asset, in accordance with some embodiments of the disclosure. A process 700 for determining whether a user consumed a segment of a media asset 102 may begin at block 702, where the control circuitry 304 retrieves data indicating a consumption history of the media asset 102. For example, the control circuitry 304 may query a database and/or analyze a user profile to identify and retrieve data indicating the consumption history of the media asset. The consumption history may indicate whether the various segments of the media asset 102 have previously been consumed by the user.

At block 704, the control circuitry 304 selects a previously unselected segment of the plurality of segments of the media asset that were identified, at block 506 (FIG. 5), to have characteristics matching the content preference retrieved at block 502 (FIG. 5). For example, the control circuitry 304 determines whether a given segment of the plurality of segments identified at block 506 has previously been selected, such as by querying a database or table, or by checking a flag included in metadata associated with the segment. If the control circuitry 304 determines that the given segment has not previously been selected, the control circuitry 304 may select the given segment.

At block 706, the control circuitry 304 determines whether the selected segment matches an entry in the consumption history retrieved at block 702. For example, the control circuitry 304 compares an identifier of the selected segment to a list of identifiers of segments that have previously been consumed and determines based on the comparison whether the selected segment has previously been consumed. In response to determining that the selected segment has previously been consumed, the process 700 proceeds to block 708. In response to determining that the selected segment has not previously been consumed, the process 700 proceeds to block 710.

At block 708, the control circuitry 304 marks the selected segment as having been consumed. For example, the control circuitry 304 generates and/or updates a list of segments of the media asset that have previously been consumed, and/or appends a flag to the metadata associated with the segment and/or the media asset 102 indicating that the selected segment has been consumed.

At block 710, the control circuitry 304 determines whether all segments of the plurality of segments have been selected. For example, the control circuitry 304 queries a database or table, or checks a flag included in metadata associated with the segments identified at block 506, to determine whether each segment of the segments identified at block 506 has previously been selected. In response to determining that all segments identified at block 506 have not been selected, the process 700 returns to block 704. In response to determining that all segments identified at block 506 have been selected, the process 700 proceeds to block 712.

At block 712, the control circuitry 304 calculates a third sum of the durations of the consumed segments of the media asset 102 that match the content preference retrieved at block 502. For example, the control circuitry 304 analyzes metadata associated with the media asset 102 to determine a duration of each of the segments that have been marked as consumed and calculates a sum of those durations.

At block 714, the control circuitry 304 generates for display a consumed progress indicator of the media asset 102 based on the third sum as a percentage of the first sum. For example, the control circuitry 304 generates the consumed progress indicator based on the third sum calculated at block 712 (i.e., the sum of the durations of the segments of the media asset 102 that were identified at block 506, and were determined, at block 706, as having previously been consumed), as a percentage of the first sum calculated at block 508 (i.e., the sum of the durations of the plurality of segments of the media asset 102 that were identified, at block 506, as having characteristics matching the content preference retrieved at block 502). For example, the control circuitry 304 calculates a value of the third sum as a percentage of the first sum (such as 10 of 40 is 25%) and generates for display a consumed progress indicator to be shown on display 100 and/or display 200, as described above.

Figure 8:
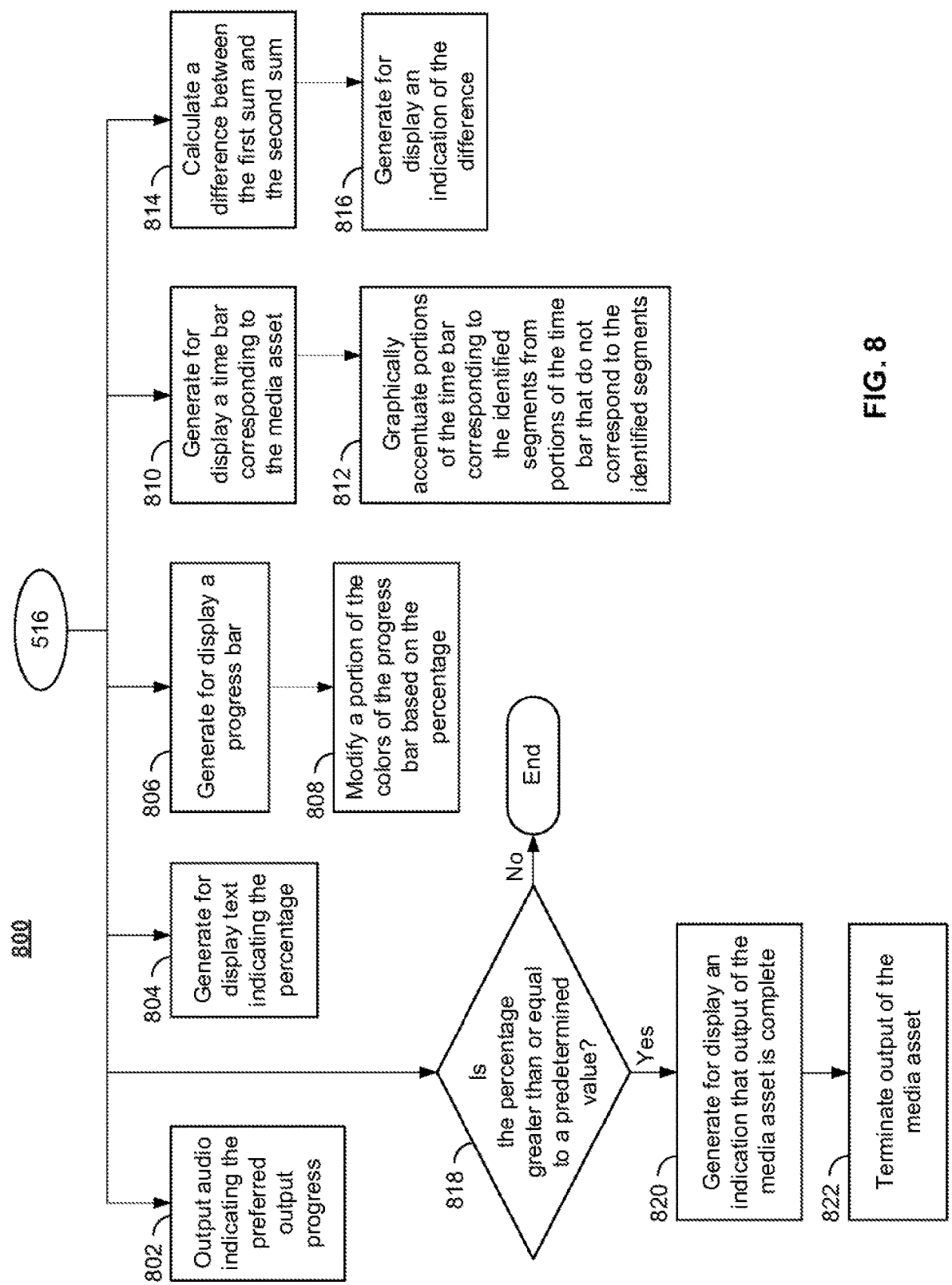
FIG. 8 is a flowchart of an illustrative process for generating an output progress indicator, in accordance with some embodiments of the disclosure.

Turning now to FIG. 8, there is shown an illustrative process for generating an output progress indicator, in accordance with some embodiments of the disclosure. A process 800 for generating an output progress indicator may begin at block 802, where the control circuitry 304 generates audio indicating the preferred output progress of the media asset 102. For example, the control circuitry 304 generates audio corresponding to the preferred progress indicator generated at block 516. In some embodiments, the control circuitry generates audio corresponding to the percentage calculated at block 516. The control circuitry 304 may further cause the media device 300, 301 to output the audio.

At block 804, the control circuitry 304 generates for display text indicating the percentage calculated at block 516. For example, the control circuitry 304 generates the preferred output progress indicator 112 and/or the progress window 130 which includes a textual representation of the percentage calculated at block 516.

At block 806, the control circuitry 304 generates for display a progress bar. For example, the control circuitry 304 generates for display the preferred progress bar 110 and the overall progress bar 120.

At block 808, the control circuitry 304 modifies a portion of the colors of the progress bar, generated at block 806, based on the percentage calculated at block 516. For example, the control circuitry 304 generates for display a progress bar having different colors corresponding to the percentage of preferred segments of the media asset 102 that has been output. In some embodiments, the control circuitry 304 generates for display the progress bar as a first color (e.g., yellow) when less than 80% of the segments having characteristics matching the content preferences of the user have been output, and modifies the color of the progress bar to a second color (e.g., green) when more than 80% of the segments having characteristics matching the content preferences of the user have been output. Those skilled in the art will appreciate that other colors and/or percentages may be used without departing from the scope of the present disclosure.

At block 810, the control circuitry generates for display a time bar corresponding to the media asset 102. For example, the control circuitry 304 generates for display the overall progress bar 120.

At block 812, the control circuitry 304 graphically accentuates portions of the time bar corresponding to the identified segments from portions of the time bar that do not correspond to the identified segments. For example, the control circuitry 304 may generate for display the overall progress bar 120, and may highlight, accentuate, or otherwise indicate the preferred segments 126a, 126b, and/or 126c in a way that distinguishes the preferred segments from the non-preferred segments 124. In some embodiments, the preferred segments 126a, 126b, and/or 126c may be displayed in different colors, textures, shapes, graphics, etc., than the non-preferred segments 124.

At block 814, the control circuitry 304 calculates a difference between the first sum and the second sum. For example, the control circuitry 304 calculates a difference between the sum of the durations of the segments of the media asset 102 that were identified at block 506, and were determined, at block 706, as having previously been consumed, and the sum of the durations of the plurality of segments of the media asset 102 that were identified, at block 506, as having characteristics matching the content preference retrieved at block 502.

At block 816, the control circuitry 304 generates for display an indication of the difference. For example, the control circuitry 304 generates for display a textual and/or graphical indication of the difference between the first sum and the second sum. In some embodiments, the difference is displayed as a "time remaining" value included in the display 100 or the display 200.

At block 818, the control circuitry 304 determines whether the percentage, calculated at block 516, is greater than or equal to a predetermined value. For example, the control circuitry 304 compares the percentage calculated at block 516 with a predetermined threshold value (e.g., 99). In response to determining that the percentage is not greater than or equal to the predetermined value, the process 800 ends. In response to determining that the percentage is greater than or equal to the predetermined value, the process 800 proceeds to block 820.

At block 820, the control circuitry 304 generates for display an indication that output of the media asset 102 is complete. For example, the control circuitry 304 may generate for display the completion indication 208.

At block 822, the control circuitry 304 terminates output of the media asset 102. For example, the control circuitry 304 ceases generating for display the media asset 102 and/or causes the media device 300, 301 to terminate output of the media asset 102.

It should be noted that processes 500-800 or any step thereof could be performed on, or provided by, any of the devices shown in FIGS. 1-4. For example, the processes may be executed by control circuitry 304 (FIG. 3) as instructed by a media application implemented on media device 300, media content source 402, and/or processing server 404. In addition, one or more steps of a process may be omitted, modified, and/or incorporated into or combined with one or more steps of any other process or embodiment (e.g., steps from process 600 may be combined with steps from process 800). In addition, the steps and descriptions described in relation to FIGS. 5-8 may be performed in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for indicating progress within a media asset, the method comprising:
   retrieving a content preference from a database;
   identifying a plurality of segments of a media asset that match the content preference, wherein each segment of the plurality of segments has a respective duration;
   calculating a first sum of the respective durations of the plurality of segments of the media asset that match the content preference;
   determining which of the plurality of segments that match the content preference precede an output position of the media asset;
   calculating a second sum of the respective durations of the segments determined to precede the output position of the media asset; and
   generating for display a progress indicator of the media asset based on the second sum as a percentage of the first sum.

2. The method of claim 1, wherein generating for display the progress indicator comprises generating for display a progress bar based on the percentage.

3. The method of claim 1, wherein the progress indicator is a first progress indicator, and the method further comprises:
   retrieving data indicating an output history of the media asset;
   identifying, based on the data indicating the output history of the media asset, a subset of the plurality of segments of the media asset that have been output;
   calculating a third sum of the respective durations of the segments of the subset; and
   generating for display a second progress indicator of the media asset based on the third sum as a percentage of the first sum.

4. The method of claim 1, further comprising:
   generating for display a progress bar for the media asset comprising:
      a first portion corresponding to a segment of the media asset that matches the content preference, the first portion having a first visual characteristic, and
      a second portion corresponding to a segment of the media asset that does not match the content preference, the second portion having a second visual characteristic different from the first visual characteristic.

5. The method of claim 1, wherein identifying the plurality of segments of the media asset that match the content preference comprises:
   retrieving metadata associated with the media asset, wherein the metadata identifies a content characteristic and a segment of the media asset associated with the content characteristic;
   determining whether the content characteristic matches the content preference retrieved from the database; and
   in response to determining that the content characteristic matches the content preference retrieved from the database, including the segment associated with the content preference in the plurality of segments.

6. The method of claim 1, wherein generating for display the progress indicator comprises generating for display text indicating the percentage.

7. The method of claim 1, wherein determining which of the plurality of segments precede the output position of the media asset comprises:
   retrieving metadata associated with each segment of the plurality of segments, wherein the metadata indicates a respective position of each respective segment within the media asset; and
   determining that a segment of the plurality of segments precedes the output position when the position of the segment within the media asset precedes the output position.

8. The method of claim 1, further comprising:
   determining whether the percentage exceeds a predefined value; and
   in response to determining that the percentage exceeds the predefined value:
      generating for display an indication that output of the media asset is complete; and
      terminating output of the media asset.

9. The method of claim 1, wherein the progress indicator is a first progress indicator, and the method further comprises:
   generating a second progress indicator based on a duration of a portion of the media asset preceding the output position as a percentage of an overall duration of the media asset; and
   generating for simultaneous display, with the first progress indicator, the second progress indicator.

10. The method of claim 1, wherein generating for display the progress indicator comprises:
    calculating a difference between the first sum and the second sum; and
    generating for display an indication of the difference.

11. A system for indicating progress within a media asset, the system comprising:
    control circuitry configured to:
       retrieve a content preference from a database;
       identify a plurality of segments of a media asset that match the content preference, wherein each segment of the plurality of segments has a respective duration;
       calculate a first sum of the respective durations of the plurality of segments of the media asset that match the content preference;
       determine which of the plurality of segments that match the content preference precede an output position of the media asset;
       calculate a second sum of the respective durations of the segments determined to precede the output position of the media asset; and
       generate for display a progress indicator of the media asset based on the second sum as a percentage of the first sum.

12. The system of claim 11, wherein, when generating for display the progress indicator, the control circuitry is further configured to generate for display a progress bar based on the percentage.

13. The system of claim 11, wherein the progress indicator is a first progress indicator, and the control circuitry is further configured to:
    retrieve data indicating an output history of the media asset;
    identify, based on the data indicating the output history of the media asset, a subset of the plurality of segments of the media asset that have been output;
    calculate a third sum of the respective durations of the segments of the subset; and generate for display a second progress indicator of the media asset based on the third sum as a percentage of the first sum.

14. The system of claim 11, wherein the control circuitry is further configured to:
generate for display a progress bar for the media asset comprising:
a first portion corresponding to a segment of the media asset that matches the content preference, the first portion having a first visual characteristic, and
a second portion corresponding to a segment of the media asset that does not match the content preference, the second portion having a second visual characteristic different from the first visual characteristic.

15. The system of claim 11, wherein, when identifying the plurality of segments of the media asset that match the content preference, the control circuitry is further configured to:
retrieve metadata associated with the media asset, wherein the metadata identifies a content characteristic and a segment of the media asset associated with the content characteristic;
determine whether the content characteristic matches the content preference retrieved from the database; and
in response to determining that the content characteristic matches the content preference retrieved from the database, include the segment associated with the content preference in the plurality of segments.

16. The system of claim 11, wherein, when generating for display the progress indicator, the control circuitry is further configured to generate for display text indicating the percentage.

17. The system of claim 11, wherein, when determining which of the plurality of segments precede the output position of the media asset, the control circuitry is further configured to:
retrieve metadata associated with each segment of the plurality of segments, wherein the metadata indicates a respective position of each respective segment within the media asset; and
determine that a segment of the plurality of segments precedes the output position when the position of the segment within the media asset precedes the output position.

18. The system of claim 11, wherein the control circuitry is further configured to:
determine whether the percentage exceeds a predefined value; and
in response to determining that the percentage exceeds the predefined value:
generate for display an indication that output of the media asset is complete; and
terminate output of the media asset.

19. The system of claim 11, wherein the progress indicator is a first progress indicator, and the control circuitry is further configured to:
generate a second progress indicator based on a duration of a portion of the media asset preceding the output position as a percentage of an overall duration of the media asset; and
generate for simultaneous display, with the first progress indicator, the second progress indicator.

20. The system of claim 11, wherein, when generating for display the progress indicator, the control circuitry is further configured to:
calculate a difference between the first sum and the second sum; and
generate for display an indication of the difference.

* * * * *